(12) United States Patent
Welschof

(10) Patent No.: US 7,303,482 B2
(45) Date of Patent: Dec. 4, 2007

(54) CONNECTING ASSEMBLY

(75) Inventor: Hans-Heinrich Welschof, Rodenbach (DE)

(73) Assignee: GKN Driveline Deutschland GmbH (DE)

( * ) Notice: Subject to any disclaimer, the term of this patent is extended or adjusted under 35 U.S.C. 154(b) by 54 days.

(21) Appl. No.: 11/020,798

(22) Filed: Dec. 22, 2004

(65) Prior Publication Data

US 2005/0163562 A1 Jul. 28, 2005

(30) Foreign Application Priority Data

Dec. 22, 2003 (DE) ............... 103 60 361

(51) Int. Cl.
*F16D 3/00* (2006.01)

(52) U.S. Cl. ............ 464/144; 464/177; 464/65.1; 411/352

(58) Field of Classification Search ........ 464/144–146, 464/177, 182, 65.1, 137, 138, 48; 411/352, 411/353, 999; 403/393
See application file for complete search history.

(56) References Cited

U.S. PATENT DOCUMENTS

| 1,548,451 | A |   | 8/1925 | Fry |         |
|-----------|---|---|--------|-----|---------|
| 1,927,780 | A | * | 9/1933 | Anderson | 292/251 |
| 6,116,386 | A |   | 9/2000 | Martin |    |

FOREIGN PATENT DOCUMENTS

| DE | 32 10 389 A1 | 4/1983 |
| DE | 42 11 868 A1 | 10/1993 |

* cited by examiner

*Primary Examiner*—Aaron Dunwoody

(57) ABSTRACT

A connecting assembly for transmitting torque between a rotational part (11) having through-holes (13) and an attaching flange (17). Bolts (21) pass through the through-holes (13) and are threaded into threaded holes (18) to bolt the rotational part (11) and the attaching flange (12) together to transmit torque. The bolts (21) have a bolt shank (23) and a threaded portion (24), wherein the diameter of the shank (D1) is greater than the diameter of the threaded portion (D2). The through-holes 13, on the inside, include radial projections (15, 16) which reduce the cross-section and which are radially deformed when the bolts (21) are inserted and threaded in, so that bolts (21), by way of the bolt shank (23), rest in a play-free way against the projections (15, 16) in the through-holes (13) of the rotational part (11).

7 Claims, 4 Drawing Sheets

CONNECTING ASSEMBLY

TECHNICAL FIELD

The invention relates to a connecting assembly for transmitting torque between a rotational part provided with through-holes on a pitch circle and an attaching flange receiving bolts which have been passed through the through-holes and threaded into threaded holes and by means of which the rotational part and the attaching flange are bolted to one another in a way to enable same to transmit torque.

BACKGROUND OF THE INVENTION

Connecting arrangements for rotational devices can take many forms. For example, various connecting arrangements have been developed for the outer joint part of constant velocity joints. In such applications, the rotational part is commonly the outer joint part of a constant velocity universal joint and the flange part is a shaft connecting flange which is to be bolted to the outer joint part. Through-holes for receiving the bolts are commonly associated with the outer joint part which, as a rule, comprises the greater axial extension. The threaded holes are typically associated with the attaching flange. Between the outer joint part and the attaching flange, it is possible to clamp in a sealing cover if the outer joint part is annular in shape, in order to form a so-called disc joint.

In the case of prior art torque transmitting assemblies of the above-mentioned type, it is possible for the bolts to become unfastened if the torque to be transmitted is higher than the torque to be accommodated by the friction forces in the flange connection. Movements can occur underneath the bolt heads, as a result of which the screws become loose. Such movements underneath the bolt heads occur if the sliding movements between the flange faces become so pronounced that the relative movements between the flange parts can no longer be accommodated by an elastic bending deformation of the bolt shanks. This is the case if the sliding movements between the flange parts cause the bending forces acting on the bolt shanks to become greater than the friction forces to be accommodated by the bolt heads. Accordingly, there exists a need for an improved connecting assembly which minimizes bolt loosening.

SUMMARY OF THE INVENTION

The present invention to provides a connecting assembly for torque transmitting purposes wherein for a given bolt size, the transferable torque can be increased and, respectively, for a given torque transmissible in a non-destructive way, a smaller bolt size can be used as compared to conventional connecting arrangements.

In accordance with one embodiment of the invention, the bolts comprise a bolt shank and a threaded portion, wherein the diameter of the shank D1 is greater than the diameter of the threaded portion D2. The through-holes are provided with radial projections which reduce the cross-sectional area and which are radially deformed when the bolts are inserted and threaded in, so that bolts, by way of the bolt shanks, rest in a play-free way against the projections in the through-holes of the rotational part. With a connecting assembly of the type disclosed herein, it is no longer necessary to transmit the torque via the friction moment built up by the friction forces between the flange faces clamped relative to one another. In fact, the friction moment can be lower than the maximum torque to be transmitted. In accordance with an embodiment of the invention, the torque is substantially transmitted via the shear moments to be accommodated by the bolt shanks. As the bolt shanks are held in the through-holes in a play-free way, no sliding movements occur underneath the bolt heads. Thus, the bolts can no longer unintentionally be unfastened.

The radial deformation of the projections when the bolts are plugged in or threaded in can be of the elastic type. To permit less stringent requirements with respect to production accuracy, the radial deformation of the projections can take place in the plastic range.

In a further aspect of the invention, projections can be provided inside the through-holes, there are provided projections which are arranged opposite one another and which, more particularly, in the circumferential direction, are arranged opposite one another on a pitch circle line of the through-holes. It is sufficient for the projections to be arranged only in the region of the exit apertures of the through-holes.

In another embodiment, the projections are produced by displacing material in the region of the apertures of the through-holes. An inventive tool for producing such material displacements in the through-holes of a rotational part comprises a punch which comprises a stop plate and a plurality of journals which are attached thereto and which can be introduced in a play-free way into the through-holes of the rotational part, wherein at the journals, in the region where they are attached to the stop plate, there are arranged projections for producing material displacements in the through-holes.

The projections in the through-holes should be dimensioned in such a way that the difference between the maximum torque to be transmitted and the friction moment at the flange connection cannot lead to permanent deformation at the projections during operation. The thread length of the bolts should also be selected to be such that, after assembly has been completed, the threadless bolt shank rests against the local projections in the through-holes.

The present invention ensures that, even under conditions of maximum torque, the circumferential movements between the rotational part and the attaching flange remain negligible or do not occur at all. In this way, it is also ensured that there do not occur any sliding movements underneath the bolt heads or any impermissible settlement losses in the threaded connection. It is thus possible, even with small bolts, to produce a secure connection in the connecting assembly. Such smaller bolts, admittedly, lead to lower tensile forces and thus lower friction forces between the flanges, but they have sufficient reserves with respect to their load bearing capacity to be able to compensate for the above-mentioned losses. The bolts can be made of quenched and tempered steel and their threads can be rolled.

Slightly higher additional costs for producing the projections or raised portions by a suitable forming operation are compensated for by clearly lower costs for the smaller bolts and smaller rotational parts and attaching flanges.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows one embodiment of an inventive connecting assembly:
A) in an axial view before the connecting bolts are threaded in; and
B) in a radial view with a partial section, after the connecting bolts have been threaded in.

DETAILED DESCRIPTION OF THE DRAWINGS

While the present invention id described with respect to a connecting assembly for a constant velocity joint, the invention may be adapted and utilized for any torque transmitting connections using bolts for securing parts together about an attaching flange. Furthermore, although the rotational part having through-holes is associated with a constant velocity joint outer part in these examples, it is to be understood that the way in which the exemplary parts are associated with each other can be changed without departing from the scope of the present invention. In other words, the application in which the present connection assembly is described is not meant to be limiting.

Figure 1A:
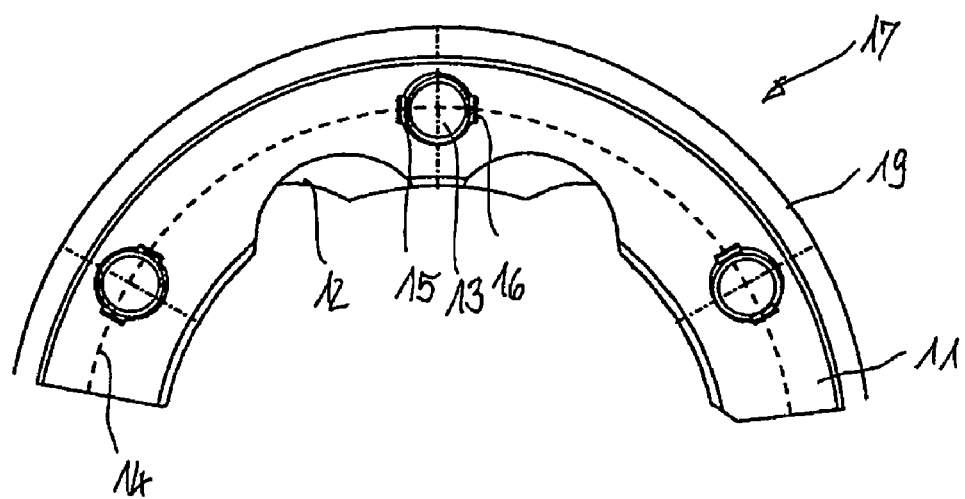
Figure 1B:
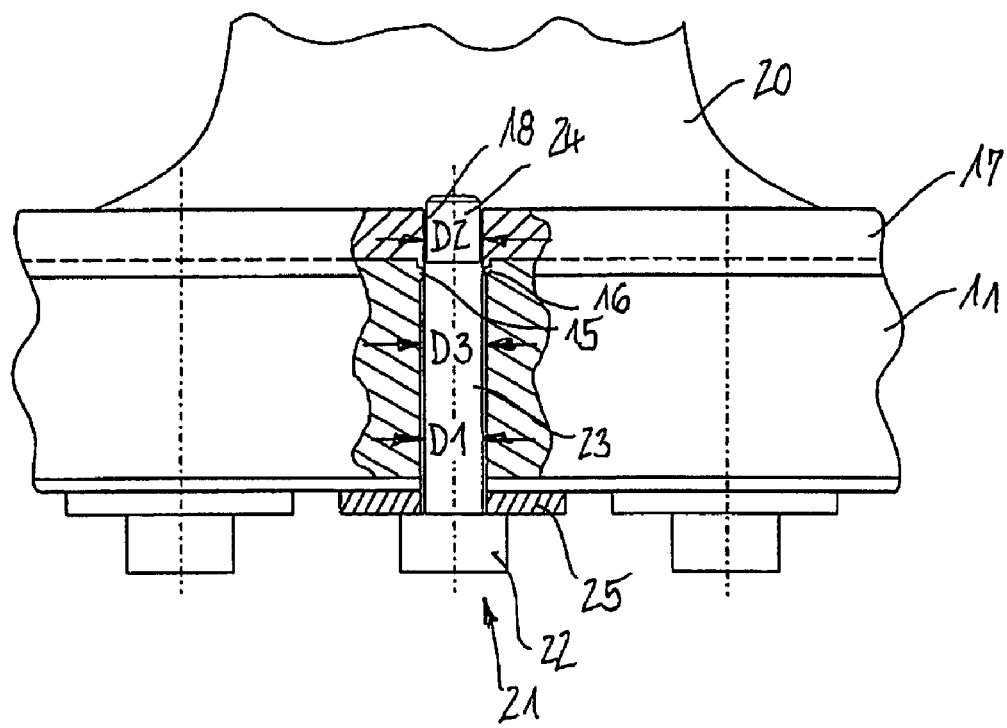

Referring now to the drawings wherein like reference numerals are used to identify similar components in the various views, FIG. 1 shows a rotational part 11 which, in this example, is provided in the form of an outer part of a constant velocity universal joint and comprises circumferentially distributed ball tracks 12 for receiving torque transmitting balls. Furthermore, the rotational part is provided with through-holes 13 for inserting bolts. The through-holes 13 comprise inwardly directed projections 15, 16 which, substantially, are arranged on the pitch circle 14 for the through-holes, which are positioned opposite one another and which reduce the free diameter of the through-holes 13.

A flange 17 provided with threaded bores 18 is connected to the rotational part 11. The flange 17 is provided with a centering collar 19 which, for centering purposes, extends over the rotational part 11. A shaft 20 is formed on to the flange 17. As can be seen in the partial section of FIG. 1B, bolts 21 are threaded into the threaded holes 18 through the through-holes 13 and comprise a bolt head 22, a bolt shank 23 and a threaded portion 24. The bolts 21 can be produced from a quenched and tempered material, and the threaded portion of the bolts 21 can be rolled. A washer 25 is placed underneath the bolt head. In accordance with an embodiment of the invention, the diameter D1 of the shank is greater than the outer diameter D2 of the threaded portion. Furthermore, the diameter D3 of the through-bore 13 is greater than the diameter D1 of the bolt shank. However, the inner projections 15, 16 which are elastically or plastically deformed while the bolts are inserted and threaded in, respectively, ensure that the rotational part 11 is held in a play-free way on the threaded-in bolts 21 relative to the flange 17.

Figure 2A:
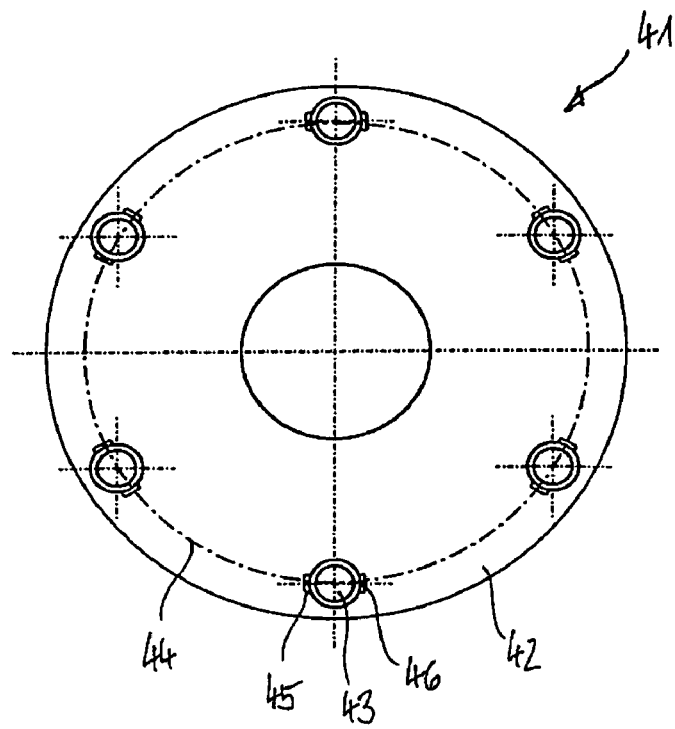
FIG. 2 shows an embodiment of an inventive punching tool:
A) in an axial view; and
B) in a radial view.
Figure 2B:
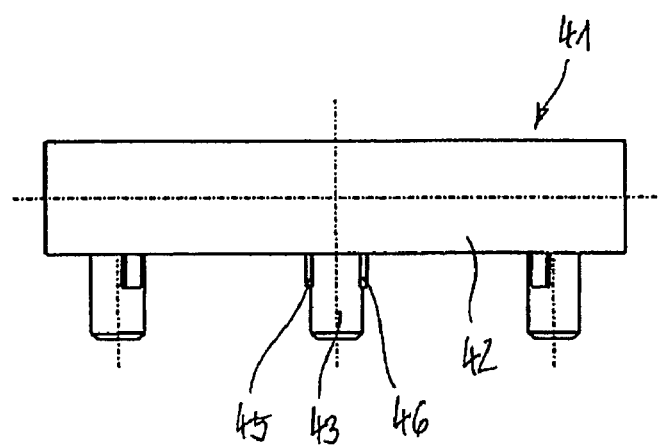

FIG. 2 shows an annular punch 41 which can be used to make the through-holes 13 in the rotational part 11 in accordance with the present invention. The annular punch 41 is shown with a base plate 42 and a plurality of centering punches 43; the centering punches 43 can be introduced into the through-holes 13 of the rotational part 11 according to FIG. 1 in a substantially play-free way. Thus, the diameters of the centering punches 43 are only slightly less than the diameters of the through-holes 13. Formed projections 45, 46 which, substantially, are positioned opposite one another and extend beyond the diameter of the centering punch 43 can be identified on the base region of the centering punch 43. The formed projections normally are positioned on the pitch circle 44 for the centering punches 43.

In operation, the centering punches 43 are introduced into the through-holes 13 until the base plate 42 stops against the end face (facing the flange) of the rotational part 11. During introduction of the centering punches 43, the projections 45, 46 are pressed into the through-holes 13 in such a way that material is displaced towards the hole axis, so that the projections 15, 16 are produced in the through-holes 13 as a result of plastic deformation.

Figure 3A:
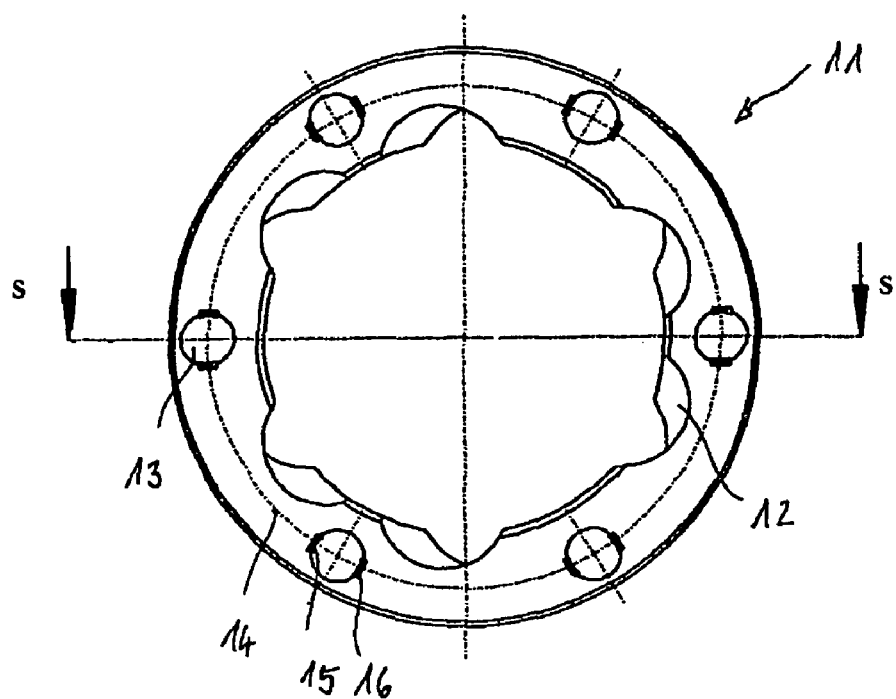
FIG. 3 shows an embodiment of an inventive rotational part:
A) in an axial view; and
B) in the section S-S.
Figure 3B:
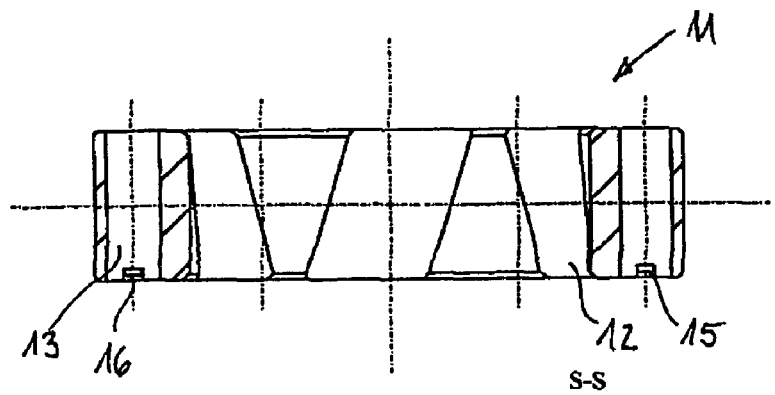

FIG. 3 shows a rotational part 11 in the form of an outer joint part of a VL plunging joint which comprises ball tracks 12 for receiving torque transmitting balls, which ball tracks 12 are alternately arranged across the circumference and extend at an angle relative to the longitudinal axis. Furthermore, through-holes 13 for inserting bolts are provided in the rotational part. The through-holes 13 comprise inwardly directed projections 15, 16 which, substantially, are positioned on the pitch circle 14 for the through-holes, which are arranged opposite one another and which reduce the free diameter of the through-holes 13. The projections 15, 16 in the through-holes 13, in the example, are positioned toward exit ends of the through-holes 13 adjacent the side of the rotational part 11 mating with the flange 17. Through-holes 13 formed in accordance with the present invention can similarly be used in other types of rotational parts including outer joint parts of other types of constant velocity joints.

Figure 4:
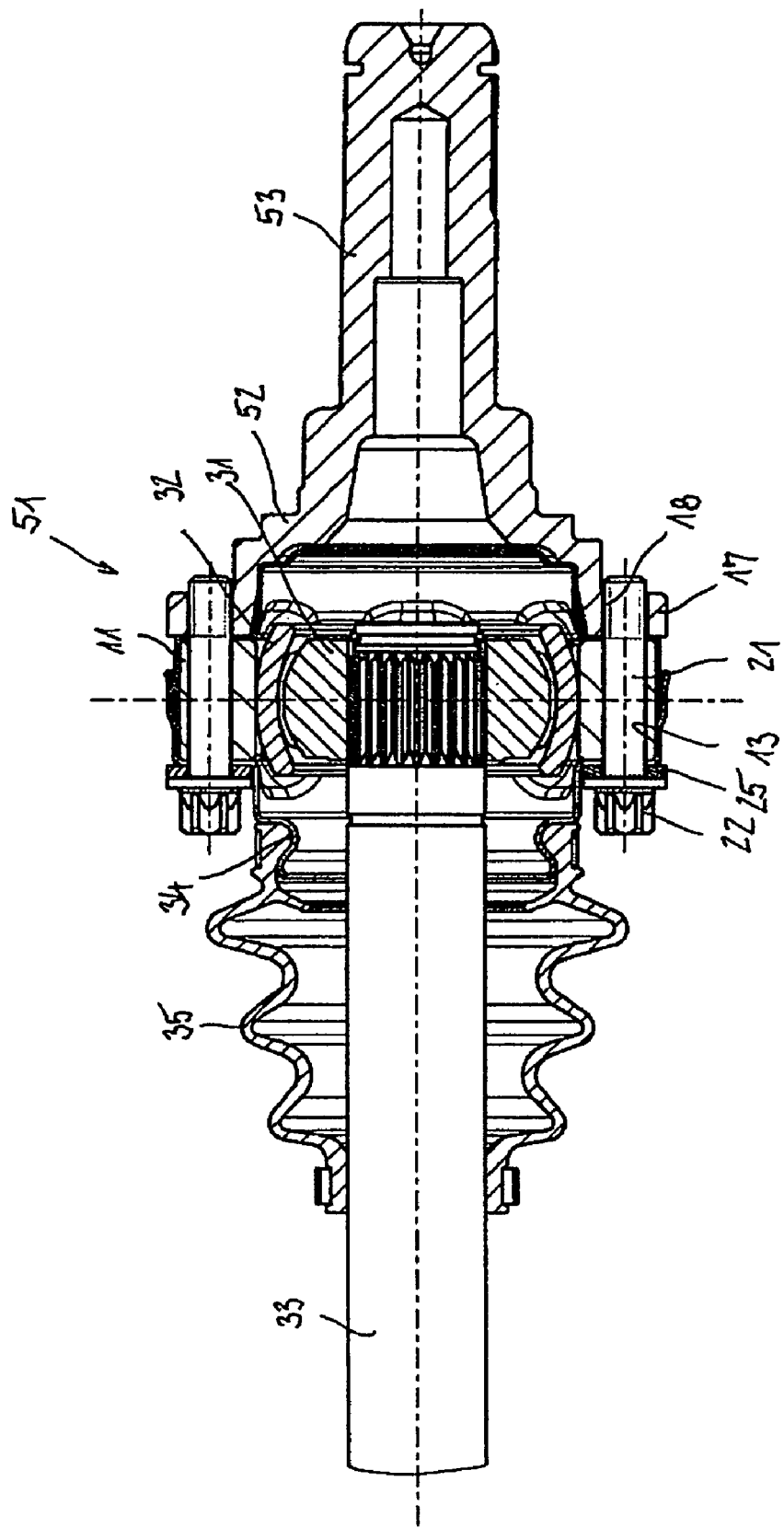
FIG. 4 shows a constant velocity universal joint with an inventive connecting assembly in a longitudinal section.

FIG. 4 shows a longitudinal section through a constant velocity universal joint 51 which, substantially, comprises of an outer joint part 11, an inner joint part 31, a ball cage 32 and torque transmitting balls (not shown in this illustration). Via an inventive connecting assembly, the outer joint part 11 is threaded to a flange 17 on to which, via a bell 52, there is formed a shaft journal 53. A shaft 33 is inserted into the inner joint part 31. An annular cover 34 is also connected to the outer joint part 11 by way of the threaded connection, with a convoluted boot 35 sealing the joint relative to the shaft 33 and being secured to the annular cover 34. The connecting assembly in accordance with the invention includes bolts 21 which are threaded into threaded holes 18 in the attaching flange 17, which pass through the through-holes 13 in the outer joint part 11 and whose bolt heads 22 are positioned on washers 25. The inventive projections 15, 16 in the through-holes 13 are preferably positioned at the exit ends of same on the side of the flange 17.

While the invention has been described in connection with several embodiments, it should be understood that the invention is not limited to those embodiments. For example, the bore diameters may vary rather than be constant. Also, although all through-holes are shown with projections, in some applications only one or several may require projections to ensure the integrity of the connection. Thus, the invention covers all alternatives, modifications, and equivalents as may be included in the spirit and scope of the appended claims.

What is claimed is:

1. A constant velocity joint assembly comprising:
an outer joint part having through-holes on a pitch circle;
an attaching flange having corresponding threaded holes; and
bolts adapted to be passed through the through-holes and threaded into the threaded holes such that the rotational part and the attaching flange are bolted to one another in a way to enable same to transmit torque,
wherein at least one bolt comprises a bolt shank and a threaded portion, a diameter of the shank (D1) being greater than a diameter of the threaded portion (D2), and wherein at least one of the through-holes comprises radial projections which reduce the cross-sectional area of the through-hole and which are radially deformed when the at least one bolt is inserted and threaded in, and wherein the at least one bolt, by way of its bolt shank, rests in a play-free way against the projections in the at least one through-hole of the rotational part.

2. A constant velocity joint according to claim 1, wherein each through-hole, on its inside, includes projections which are arranged opposite one another.

3. A constant velocity joint according to claim 1, wherein the projections are provided only near an exit aperture of the through-holes.

4. A constant velocity joint accordingly to claim 3, wherein the projections are formed by material displacement near an end face of the outer joint part.

5. A constant velocity joint according to claim 1, comprising an annular cover connected to the outer joint part, a shaft connected to an inner joint part, and a convoluted boot connected to said cover and sealing the joint relative to the shaft.

6. A constant velocity joint according to claim 1, wherein the radial projections am formed by introducing a punch having projections thereon for producing material displacement In the through-hole.

7. A constant velocity joint according to claim 5, wherein the aching flange is connected to a shaft journal by a bell-shaped housing.

* * * * *

UNITED STATES PATENT AND TRADEMARK OFFICE
CERTIFICATE OF CORRECTION

PATENT NO. : 7,303,482 B2
APPLICATION NO. : 11/020798
DATED : December 4, 2007
INVENTOR(S) : Hans-Heinrich Welschof It is certified that error appears in the above-identified patent and that said Letters Patent is hereby corrected as shown below:

In The Claims:

Claim 4, Column 6, Line 4, should read as follows:
-- A constant velocity joint according to claim 3, --

Claim 6, Column 6, Line 13, should read as follows:
-- the radial projections are formed by introducing a punch --

Claim 6, Column 6, Line 15, should read as follows:
-- ment in the through-hole. --

Claim 7, Column 6, Line 17, should read as follows:
-- the attaching flange is connected to a shaft journal by a --

Signed and Sealed this

Twenty-ninth Day of April, 2008

JON W. DUDAS
*Director of the United States Patent and Trademark Office*